A. HAWKENS & G. H. WETZEL.
Wagon Tongue and Doubletree.

No. 196,091. Patented Oct. 16, 1877.

WITNESSES
Nat E. Oliphant
T. D. D. Durand

INVENTORS
A. Hawkens.
G. H. Wetzel.
per Chas. H. Fowler
Attorney

UNITED STATES PATENT OFFICE.

ALEXANDER HAWKENS AND GEORGE H. WETZEL, OF LANCASTER, OHIO.

IMPROVEMENT IN WAGON-TONGUE AND DOUBLE-TREE.

Specification forming part of Letters Patent No. 196,091, dated October 16, 1877; application filed July 6, 1877.

*To all whom it may concern:*

Be it known that we, ALEXANDER HAWKENS and GEORGE H. WETZEL, of Lancaster, in the county of Fairfield and State of Ohio, have invented a new and valuable Improvement in Wagon-Tongue and Double-Tree; and we do hereby declare that the following is a full, clear, and exact description of the construction and operation of the same, reference being had to the annexed drawings, making a part of this specification, and to the letters and figures of reference marked thereon.

Figure 1:
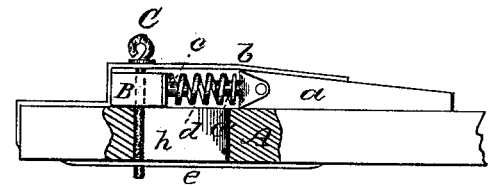
Figure 2:
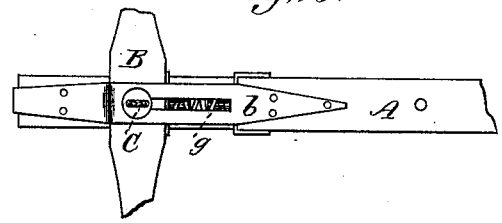
Figure 3:
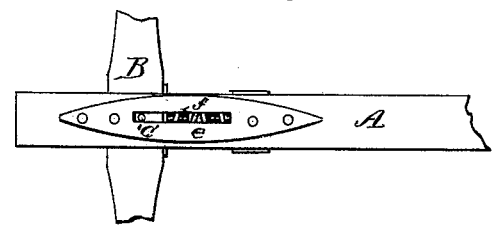

Figure 1 of the drawings is a representation of a side elevation of our invention, partly in section; Fig. 2, a top-plan view of the same; and Fig. 3, a similar view of the under side.

This invention relates to that class of devices known as "vehicle-tongues and double-trees;" and the object and purpose of the present invention are to provide such a tongue and double-tree that will readily yield to any sudden jolting of the vehicle caused by imperfections in the road upon which the vehicle may be traveling, and thereby relieve the horse or horses from the strain caused by said jolting.

This invention therefore consists in the construction and arrangement of the several parts, as will be hereinafter described, and subsequently pointed out in the claim.

In the accompanying drawings, A represents the tongue of a vehicle, having, a suitable distance from its end, a shoulder, $a$, upon which is fastened one end of a plate, $b$, the other end of said plate being bent down and around the end of the tongue to form a space, in which is placed a double-tree, B. The tree B, as well as the shoulder $a$, have projections $c$ $c'$, for holding within the space formed by the plate $b$ a spring, $d$, said spring bearing against the double-tree B.

To the under side of the tongue is secured a plate, $e$, having an elongated slot, $f$, to correspond with an elongated slot, $g$, formed in the plate $b$.

The double-tree B is held within the space formed by the plate $b$ by a coupling-pin, C, which passes through the elongated slots $b$ and $e$, and through the tongue and tree A and B. This pin acts both as a coupling and guide pin.

It will be readily seen that when the tongue and double-tree are in use the latter would be drawn up until the projection $c$ comes in contact with the projection $c'$ upon the shoulder $a;$ and, should the vehicle meet with obstruction or imperfection in the road, the spring would perform its function in relieving the horse or horses from the sudden strain or jerking that would naturally occur.

The projections $c$ $c'$ not only serve the purpose of retaining the spring in position within the space, but also prevent the coils of the spring being jammed together, the pins for this purpose acting as stops.

An elongated opening, $h$, is formed through the tongue to correspond with the openings in the plates $b$ and $e$.

Having now fully described our invention, what we claim as new, and desire to secure by Letters Patent, is—

The tongue A, having the elongated slot $h$, shoulder $a$ with projection $c'$, and curved plate $b$ with slot $g$, in combination with the tree B, having projection $c$, the pin C, and coil-spring $d$, constructed to operate substantially as specified.

In testimony that we claim the above we have hereunto subscribed our names in the presence of two witnesses.

ALEX. HAWKENS.
    GEO. H. WETZEL.

Witnesses:
  THOS. H. WHITE,
  HENRY SEARS.